April 5, 1949.  C. Z. MONROE ET AL  2,466,180
REVERSING CONTROL FOR ELECTRIC MOTORS
Filed June 17, 1944  5 Sheets-Sheet 1

INVENTORS
Charles Z. Monroe
Victor G. Smith
By Carlson, Pitzner, Hubbard & Wurzer
ATTORNEYS April 5, 1949.  C. Z. MONROE ET AL  2,466,180

REVERSING CONTROL FOR ELECTRIC MOTORS

Filed June 17, 1944  5 Sheets-Sheet 2

INVENTORS
Charles Z. Monroe
Victor G. Smith
By Carlson, Pitzner, Hubbard & Wolf
ATTORNEYS

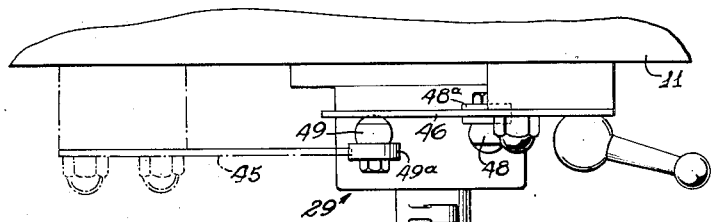
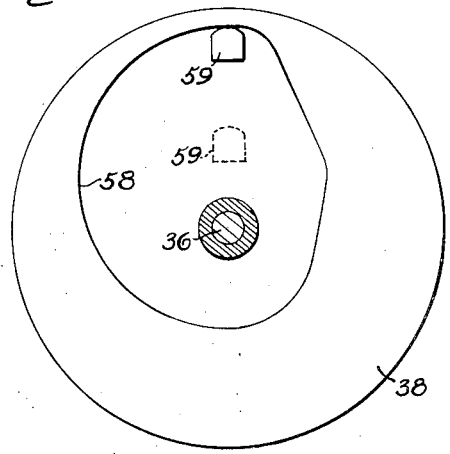
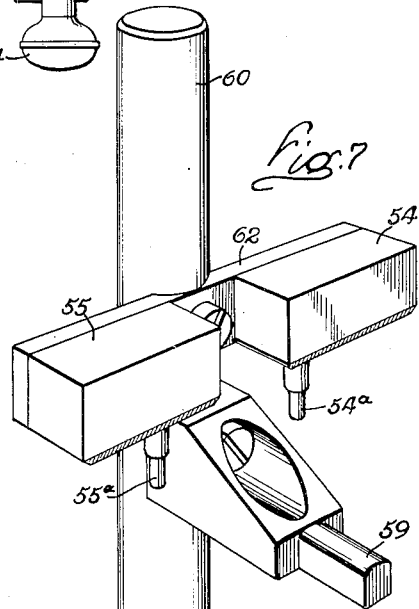
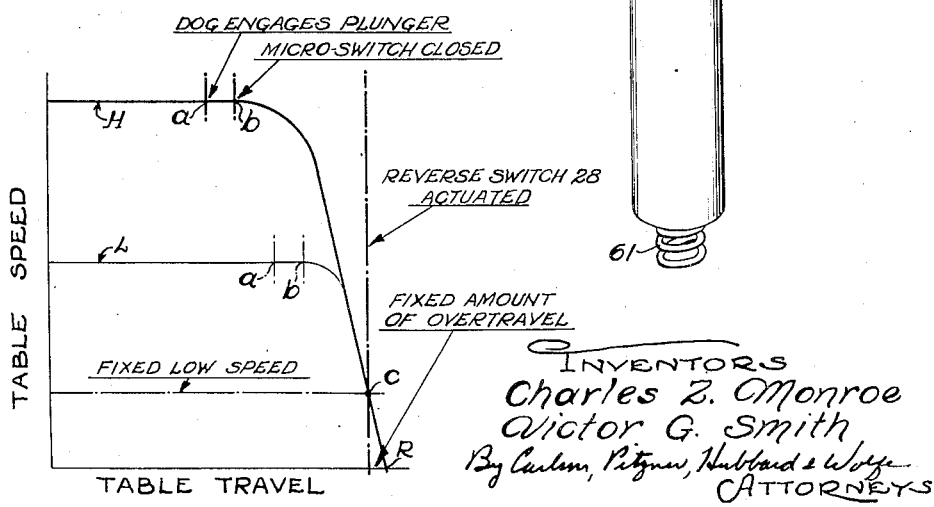

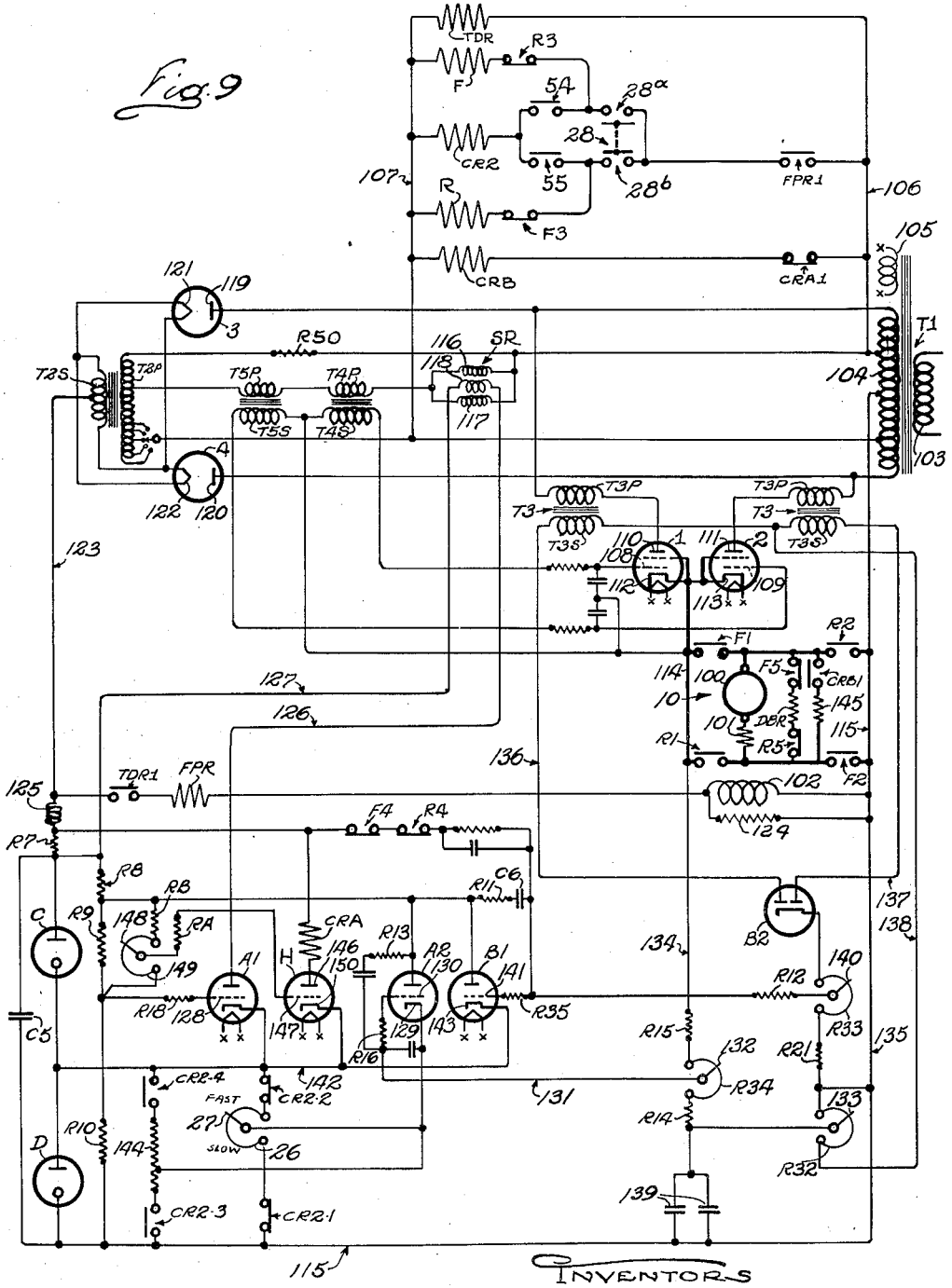

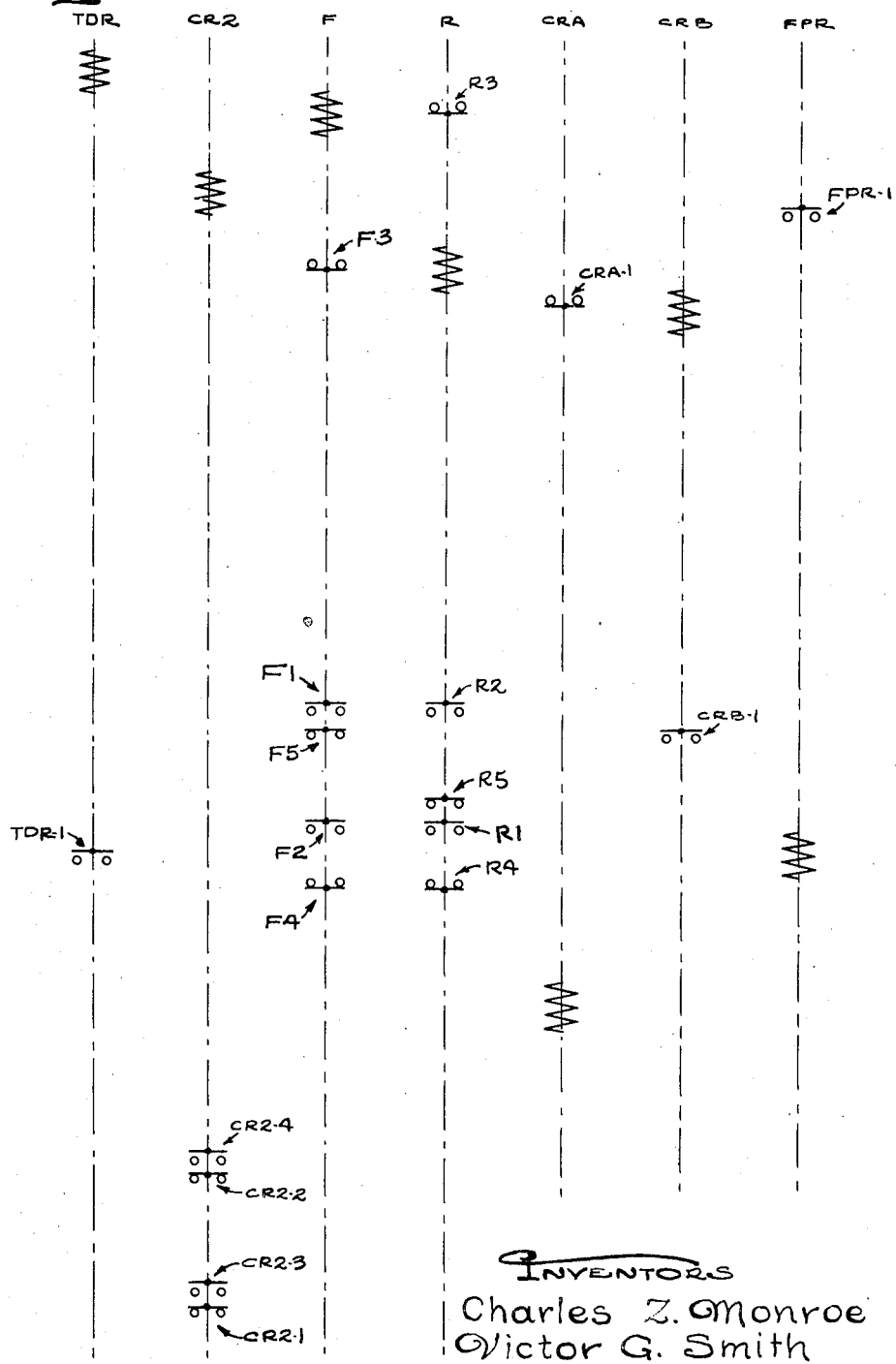

Patented Apr. 5, 1949

2,466,180

UNITED STATES PATENT OFFICE 2,466,180

REVERSING CONTROL FOR ELECTRIC MOTORS

Charles Z. Monroe and Victor G. Smith, Detroit, Mich., assignors to Ex-Cell-O Corporation, Detroit, Mich., a corporation of Michigan Application June 17, 1944, Serial No. 540,871

6 Claims. (Cl. 318—258)

The present invention pertains to reversing controls for electric motors, the general aim being to provide a novel arrangement for positively insuring reversal of an electric motor at a precisely determined point, irrespective of the operating speed of the motor prevailing prior to institution of the reversing operation.

The problem which the present invention solves occurs in many fields, one in which it is particularly acute being that of machine tools employing an electric drive motor for a heavy reciprocating carriage or table such, for example, as in grinders, planers, milling machines etc. Machine tool carriages and similar elements are, in such instances, normally reciprocated back and forth through a predetermined working range, and at a rate of traverse adjustable in accordance with the requirements of the machining operation to be performed. Due to their comparatively heavy weight, machine tool carriages will overrun the point at which reversal is initiated, and this overrun will vary considerably in extent, if an ordinary reversing control is used. It is an object of the present invention to provide a reversing control suitable for use with electric drive motors for even such heavy driven elements as large machine tool carriages, which control is of such character as to reduce the motor speed automatically to a predetermined low value preparatory to reversal so that upon actuation of the reversing switch the overtravel following the actuation of such switch will not only be small but also precisely constant, quite without regard to the speed at which the motor may have been operating prior to its automatic slowdown.

Another object is to provide a novel reversing system for electric motors embodying an arrangement for automatically braking the motor to a predetermined low speed prior to actuation of the reversing switch and during a braking period automatically proportioned in accordance with the prior operating speed in order to minimize the time consumed in slowing down for the precision point reversal.

Still another object is to provide a reversing control for electric motors of such character as to utilize an automatic slowdown of the motor prior to actually throwing the reversing switch in such manner as to insure precisely constant overtravel following such switch actuation, and in which high speed operation at a preset value is initiated in the opposite direction immediately following reversal.

The invention also resides in various novel combinations and sub-combinations of elements embodied in the control mechanism herein disclosed, and further objects and advantages of the invention will appear as the following description proceeds, taken in connection with the accompanying drawings in which:

Fig. 5 is a fragmentary top view of the control unit of Figs. 2 to 4 and showing the righthand one of the pair of control dogs passing over the same, the other of the pair of dogs being indicated in dot-dash lines.

Fig. 6 is an enlarged view of the inner face of the control dial mounted on the unit of Figs. 2 to 4 and showing the control cam on such inner face of the dial.

Fig. 7 is an enlarged perspective view of the central plunger and pair of Microswitches carried thereby, included in the control unit of Figs. 2 to 4.

Fig. 8 is a velocity diagram illustrating the deceleration of the carriage movement prior to reversal.

Fig. 9 is a wiring diagram of the complete control system for the drive motor included in the machine of Fig. 1.

Fig. 9a is a key sheet for Fig. 3 showing the electromagnetic switches in spindle form with the contacts and coils arranged on the spindles in horizontal agreement with the corresponding contacts and coils in the wiring diagram of Fig. 3.

Figure 1:
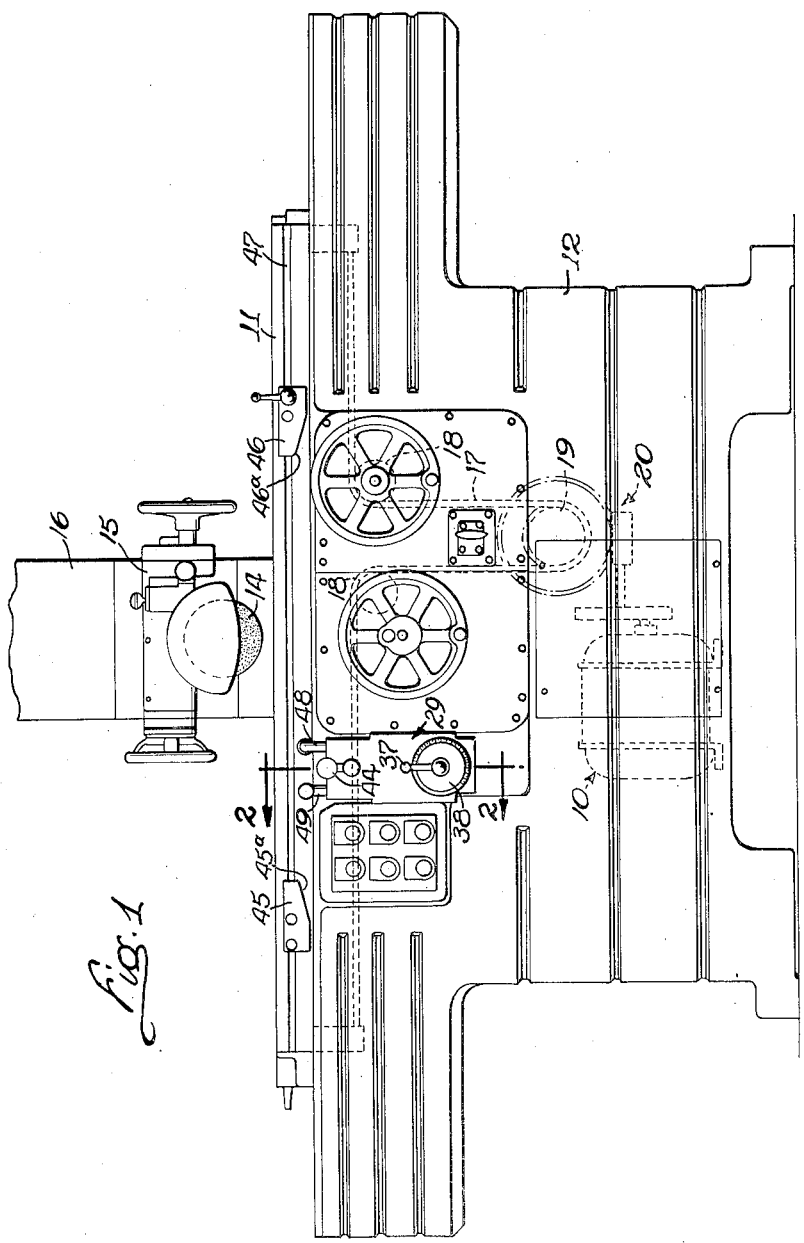
Figure 1 is a front elevational view of a machine having a reciprocatory carriage operated by a drive motor equipped with a reversing control embodying the present invention.

In the present instance the invention has been illustrated as embodied in a reversing control for the electric drive motor 10 connected to the reciprocatory carriage 11 of a grinding machine (Fig. 1). It should be understood, however, that such use is purely exemplary and that there is no intention to limit the invention to such environment or use. On the contrary, the intention is to cover all uses and adaptations of the control mechanism embodying the invention, as well as all modifications and alternative constructions thereof falling within the spirit and scope of the invention as expressed in the appended claims.

Before taking up a more detailed exposition of the reversing control itself, a brief identification of the principal elements of the machine in which it is shown as installed in the exemplary use will be made. The machine illustrated in Fig. 1 comprises a horizontal base 12 on which the carriage 11 is slidably mounted. In the present instance the carriage 11 is adapted to support a work piece (not shown) for reciprocation in opposite directions past a surface grinding wheel 14, the latter being supported for rotary drive in a suitable toolhead 15 on a vertical column 16 on the rear of the base 12. The details of the support and drive for the grinding wheel 14 form no part of the present invention, and hence are not fully disclosed. To connect the carriage 11 in driven relation with the motor 10, a roller chain 17 is anchored at its ends to opposite end portions of the carriage and is led over idler sprockets 18 as well as over a drive sprocket 19. The latter is driven through suitable speed reduction gearing 20 directly from the drive motor 10. The speed and direction of movement for the carriage 11 are thus directly dependent upon the speed and direction of rotation of the motor 10 to which it remains drivingly connected at all times.

Figure 2:
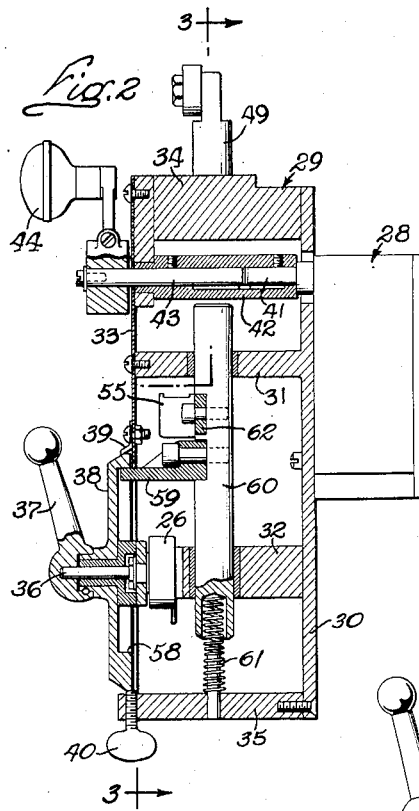
Fig. 2 is an enlarged detail sectional view taken substantially along the line 2—2 in Fig. 1 and showing the interior of the reversing control unit or panel mounted on the front of the machine.

Any variable speed reversible electric motor may be employed as the drive motor, the motor 10 having been shown herein (Fig. 9) as being a compound direct current motor simply by way of specific example. Moreover, any one of a number of means well-known in the art may be employed for varying the speed of the drive motor although preferably the arrangement is such that it may be accomplished through the manual adjustment of some compact device such as a small rotationally adjustable potentiometer in order that it be adapted for convenient mounting in a control unit on the front of the machine. Again, by way of specific example, the motor 10 has been shown herein as connected for speed control by adjustment of the potentiometer 26 (see Figs. 2 and 9) having a slider 27 which may be turned to correspondingly speed up or slow down the motor, this potentiometer being arranged to operate through a suitable vacuum tube type circuit, as will hereinafter appear.

Turning now to the reversing control which embodies the present invention, the arrangement is, in brief, such that limit control devices operated from the reciprocable carriage 11 serve not only to throw a main reversing switch 28 (see Figs. 2 and 9) for the motor, but also actuate a supplemental control switch or switches in advance of the actuation of the reversing switch and which effect automatic and rapid deceleration of the motor 10 to a fixed low value which is at least no greater than the minimum speed setting of the speed control device 26. In this manner the motor is always slowed down to its preset low speed by the time the reversing switch is thrown so that the subsequent overtravel will not only be small but also of a fixed and unvarying length. In that way the points of reversal for the carriage are maintained accurately, irrespective of what speed may be selected for table traverse.

Figure 4:
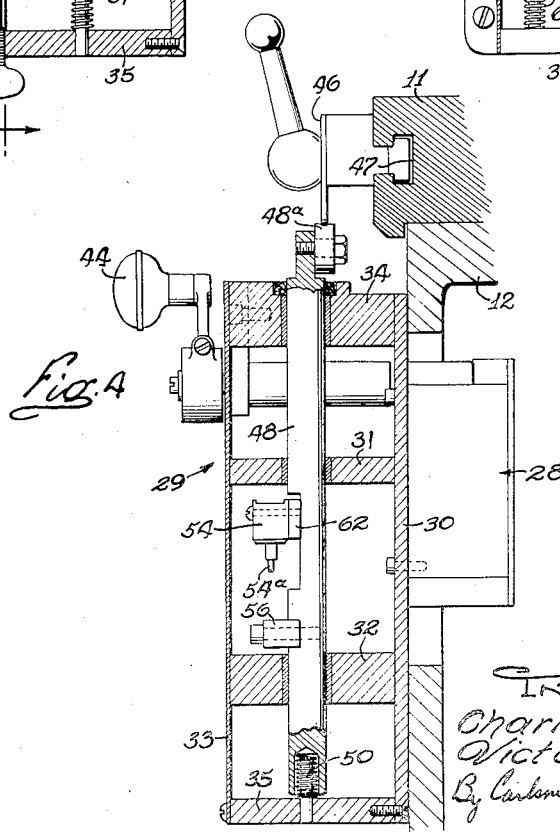
Fig. 4 is a sectional view taken substantially along the line 4—4 in Fig. 3.

For convenience of mounting and installation, the reversing control mechanism is, in the present instance, incorporated in a small control panel or unit designated generally as 29 and detachably fixed to the front of the machine base (see Figs. 1 and 4). This panel comprises a mounting base 30 from which extend forwardly projecting webs or partitions 31, 32. A cover plate 33 is fixed to the web 31 and a top cover 34 is fixed to this front cover plate. A bottom closure 35 is fixed to the base plate 30.

The speed control potentiometer 26 is fixed to the partition 32 and has an operating shaft 36 (Fig. 2) for its slider 27, which projects forwardly through the front cover plate 33. An operating handle 37 and graduated dial 38 are fixed to this shaft, the dial being arranged to coact with a stationary index pointer 39 to indicate the speed setting for the motor and a thumb screw 40 serving to maintain the dial in adjusted position.

The reversing switch 28 is, on the other hand, mounted on the rear face of the base 30 (see Figs. 2 and 4) and has an operating shaft 41 which projects forwardly within the unit housing. Keyed to this shaft 41 is a sleeve 42 which is also keyed to a second shaft 43, axially aligned with the first, and projecting from the front of the cover 33 with a manual operating handle 44 affixed. Rocking the switch operating shaft 41 through a few degrees in respective opposite directions from the central "off" position shown serves to shift the switch to its corresponding forward and reverse or "on" positions.

The limit control means for actuating the reversing switch 28 in accordance with the position of the carriage 11 in the latter's path of travel comprises, in the present instance, a pair of dogs or cams 45, 46 adjustably mounted in a T-slot 47 extending along the front edge of the table. These dogs coact with respective ones of a pair of plungers 48, 49 vertically slidable within the panel 29 and yieldably urged upward by compression springs 50. The plungers, as well as the dogs, are laterally offset with respect to each other (see Fig. 5) so that the dog 46 is aligned for contact only with its corresponding plunger 48, and, similarly, the dog 45 is aligned for operation only with its plunger 49. The active edges of the dogs are configurated to form inclined cam slopes, as indicated at 45a and 46a; and rollers 48a, 49a journaled on the protruding upper ends of the plungers ride along these sloped cam edges as the dogs override the respective plungers. As the carriage 11 approaches its lefthand extremity of movement (as viewed in Fig. 1) the dog 46 rides over the plunger 48, depressing the same, and similarly as the carriage approaches its other or righthand extremity of movement the dog 45 depresses the plunger 49. The slope of the dog edges 45a, 46a accomplishes a positive and gradual or progressive depression of the plungers.

Figure 3:
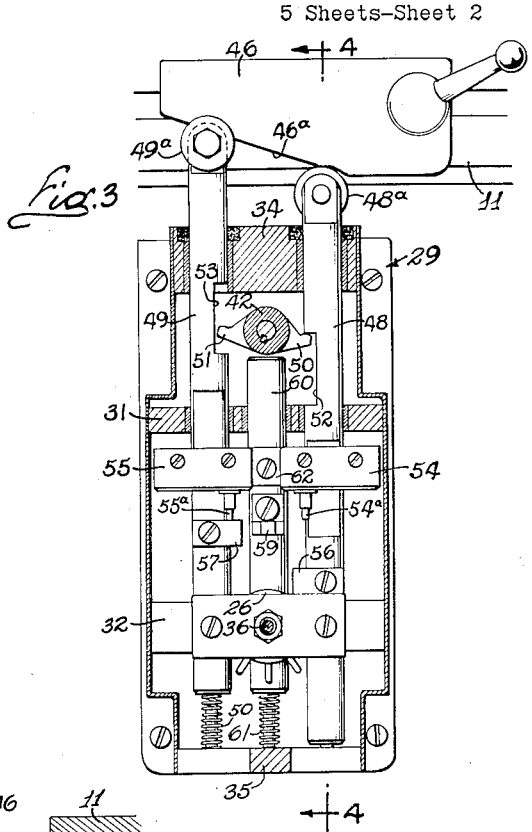
Fig. 3 is a transverse sectional view through the control unit taken substantially along the line 3—3 in Fig. 2.

To operate the reversing switch 28 by the plungers 48, 49, lost motion connections are provided including laterally projecting arms 50, 51 on the sleeve 42 (Fig. 3) and which are received in elongated notches 52, 53 in the respective plungers. Thus as either of the plungers 48, 49 descends, the reversing switch will remain unaffected until the plunger has nearly completed its descent and at which time the appropriate one of the arms 50 or 51 is struck by the shoulder at the upper end of its corresponding slot 52 or 53 so that the shaft 41 is rocked to throw the reversing switch.

The movement of the plungers 48, 49 preceding actuation of the reversing switch 28 is utilized for initiating the automatic slowdown of the drive motor 10 and to which reference has been made above. For that purpose a pair of Microswitches 54, 55 is located for engagement of their respective operating buttons 54a, 55a (Fig. 3) by lugs 56, 57 fixed to the corresponding plungers 48, 49. These Microswitches 54, 55 have contacts (of conventional form, not shown) which are spring-biased to closed position but are both normally held open by the lugs 56, 57. Whenever either plunger is depressed its lug leaves the operating button of the associated Microswitch, permitting the switch to close. Various suitable means may be employed for causing such switch closure to slow down the drive motor 10 to a preset slow speed preparatory to actuation of the reversing switch 28, and a particular means will, simply by way of specific example, be described hereinafter.

The minimum time required for decelerating the motor 10 from its traverse speed to its predetermined low speed suitable for reversal is dependent upon the disparity between such speeds or, in other words, upon how much greater than the low reversal speed the traverse speed happens to be. In a machine tool like that shown, a wide range of speed adjustment is desirable and in such case the highest available traverse speed may be many times the lowest. In such case, to initiate deceleration invariably at a time sufficiently in advance of the operation of the reversing switch to accommodate slowdown from the highest available traverse speed would result in a substantial waste of overall operating time since the predetermined low speed for reversal may be of the order of an inch per minute travel for the carriage and it is therefore time consuming to have the carriage run at such low speed any longer than is absolutely necessary. Accordingly, provision has been made herein for proportioning the time allotted for deceleration in accordance with the speed at which the carriage has been traversing.

To accomplish such proportioning, the Microswitches 54, 55 are raised or lowered bodily in accordance with the speed setting of the variable setting speed control device (potentiometer 26). As the switches 54, 55 are raised or lowered, the yieldably mounted plungers 48, 49 go up or down retaining the lugs 56, 57 in contact with the switch operating buttons 54a, 55a. Such raising or lowering of the plungers varies the points on the sloped surfaces 45a, 46a of the coacting dogs 45, 46 at which the plungers will be contacted by the latter. Thus, if one of the plungers is lowered it will be contacted by its dog at a later point in the path of travel of the carriage 11, whereas if the plunger is elevated it will be contacted by its dog at a slightly earlier point in the path of travel of the carriage. Since the closing of the associated Microswitch takes place at a fixed interval after contact of its plunger by the latter's corresponding dog (some finite interval being inevitable because of lost motion in the switch's operating button and parts of the switch itself) the time elapsing between closure of the Microswitch and the subsequent actuation of the reversing switch 28 is dependent upon the vertical position of the plunger at the instant it is contacted by its associated dog. Accordingly, bodily raising and lowering of the Microswitches 54, 55, with the resultant raising and lowering of the plungers 48, 49 as described, serves to adjust the time interval elapsing between closure of one of the Microswitches and actuation of the reversing switch or, in other words, the interval of time during which the deceleration of the motor to its predetermined low speed for reversal is effected.

Raising and lowering of the Microswitches 54, 55 for the purpose explained above is accomplished by the action of a continuous, generally spiral cam surface 58 (Figs. 2 and 6) formed about the periphery of an eccentric recess in the inner face of the dial 38. A cam follower projection 59 protrudes generally horizontally into this recess in position to ride along the cam surface 58 and is fixed to a plunger 60 disposed centrally between the pair of plungers 48, 49 heretofore mentioned. The plunger 60 is, like the plungers 48 and 49, slidably guided for vertical movement in the webs 31, 32, and is yieldably urged upward by a compression spring 61 so that the nose of the cam follower projection 59 remains constantly in contact with the cam surface 58. Turning of the dial 38 thus serves to raise and lower the plunger 60 in accordance with the contour of the cam surface 58, the latter being shaped to afford a deceleration time interval properly proportioned to the progressive changes in speed accomplished by turning of the dial. The Microswitches 54, 55 are fixed to a cross bar 62 rigid with the plunger 60 so that they move bodily up and down with the latter (see Fig. 7).

From the foregoing the general cycle of operation of the reversing control mechanism disclosed will be apparent. Assuming the motor 10 to be running and the dogs 45, 46 to have been adjusted in position for some selected length of stroke for the carriage 11, the latter will reciprocate back and forth. As the carriage approaches one of its terminal positions, the sloped surface 45a or 46a of the corresponding dog 45 or 46 rides over the associated plunger 48, 49, progressively depressing the latter. After a very short, and fixed, period (indicated by the distance a—b in the velocity diagram curves of Fig. 8) consumed in the initial downward movement of the plunger being depressed, the associated Microswitch (54 or 55, as the case may be) is released and thus permitted to close, initiating automatic deceleration of the drive motor 10 to a predetermined low speed. Thereafter substantially at the instant the plunger completes its downward movement it engages a corresponding one of the arms 50, 51 and throws the reversing switch from one extreme or "on" position of the latter to the other, thereby reversing the connections to the drive motor. The interval of time elapsing between closure of the Microswitch and tripping of the reversing switch is calculated to be just sufficient to effect the required deceleration of the motor with a small margin of safety. Upon tripping of the reversing switch, the motor is energized, through the use of suitable circuit connections, a specific example of which is hereinafter detailed, for immediate resumption of its traverse speed in the opposite direction at a rate determined by the setting of the dial 38.

To adjust the traverse speed for the carriage 11 the operator has only to grasp the handle 37 and turn the dial 38. This not only changes the setting of the speed control device (shown as the potentiometer 26) but also serves simultaneously to raise or lower the Microswitch supporting plunger 60 and thus proportionately change the period allotted for motor deceleration at reversal in the manner heretofore described. In the velocity diagram (Fig. 8) the curves H and L represent operation at respectively high and low speed settings. As there indicated, deceleration sets in at an earlier point for high speed operation than for low speed (accomplished by difference in elevation of plungers as described above), but in each case the speed is reduced to the same fixed low value at the point C where the reversing switch is tripped so that the identical small overtravel occurs in all instances.

Having in mind the foregoing general operating characteristics of the apparatus, attention may now be given to somewhat more of the detail of an exemplary one of the variety of specific circuit hookups (Fig. 9) that may be used with the heretofore described apparatus. In the present instance the motor 10 has been shown as having an armature 100, a series field 101 and a separately excited field 102, the motor being equipped with the usual pair of reversing contactors shown as having respective actuating windings F and R and main contacts F1, F2 and R1, R2, as well as two sets of normally closed interlock contacts F3, R3 and F4, R4. The usual dynamic braking resistor DBR is arranged to be connected across the motor armature by normally closed auxiliary contacts F5, R5 of the reversing contactors.

Current for the network is supplied from a main transformer T1 having a primary winding 103 connected to a suitable source (not shown) of alternating current, a secondary winding 104 tapped to supply current at appropriate voltages to various portions of the network, and a tertiary winding 105 for supplying the cathode heaters of various vacuum tubes that are employed, the connections to such heaters having been omitted for simplicity of diagramming. Potential tapped from the transformer secondary winding 104 is applied between conductors 106 and 107 for supplying the actuating windings F and R of the reversing contactors as well as the actuating windings of various relays hereinafter identified. When the reversing switch 28 is in its mid or "off" position shown in Fig. 9, both of its contacts 28a and 28b are open. Upon manual shifting such switch to either of its alternatively available "on" positions, either the contact 28a or 28b, as the case may be, connects the associated contactor winding F or R across the lines 106, 107 to pick up the associated contactor and start the motor 10 in the desired direction. The contacts R3 or F3, as the case may be, lock out the non-selected contactor. Such closure of either of the reversing contactors is prevented until a suitable time interval has elapsed after application of voltage to the system for the tubes to warm up to operating temperature. Such delay is accomplished through the use of a time delay relay having an actuating winding TDR connected across the lines 106, 107 and having contacts TDR1 in series with the separately excited field 102 and actuating winding FPR of an interlock relay. The normally open contacts FPR1 of the latter relay are inserted in the supply connections to the reversing switch as shown. Accordingly, the time interval for which the time delay relay is set must elapse before its contacts TDR1 close to pick up the relay FPR and enable the latter to condition the reversing switch and contactors for service.

The motor's armature current is varied to control the motor's speed and for that purpose current is fed to the armature through a pair of thyratron tubes 1, 2, the phase of whose control grids 108, 109 is adjusted to vary the current which they pass to the armature. Such arrangements and the apparatus therefor are well-known and accordingly need not be detailed here. Suffice it to say that two thyratrons are used in order to effect full wave operation and their anodes 110, 111 are connected to opposite end terminals on the supply transformer's secondary winding 104 while their cathodes 112, 113 are connected together and to a supply line 114. The latter is connected to the motor armature 100 either through contacts F1 or R1 and connection is thence established from the other armature terminal back to a center tap on the transformer secondary 104 through a conductor 115 and either the contact F2 or R2.

The phase of the control grids 108, 109, and hence the speed of the motor 10, is varied through the use of a saturable core reactor SR included in an alternating current phase shifting bridge whose two legs are comprised by a resistance R50 and the reactor SR. The latter has a pair of shunt connected alternating current windings 116, 117 and a direct-current-excited saturation-control winding 118. Potential is applied to the bridge from a transformer winding T2P, the windings 116, 117 of the reactor SR being connected to the winding T2P in series with a pair of transformer primary windings T4P and T5P. The secondary windings T4S and T5S of these latter transformers are connected in the input circuits of the tubes 1, 2. In the bridge circuit noted the resistance of the leg R50 remains constant but the reactance of SR is controllably altered, thereby changing the vector relationship of T4P, T5P with respect to T2P. When there is very little direct current in the reactor's control winding 118, the reactance of windings 116, 117 of SR is very large and the alternating current voltage supplied to T4P, T5P is far out of phase with the alternating current voltage supplied to the anodes of the tubes 1 and 2. Therefore the windings T4S, T5S do not fire the latter tubes until very late in their respective half cycles. The voltage supplied to the motor armature 100 is therefore very low so that the motor turns at a low speed. On the other hand, when the amount of direct current supplied to the winding 118 of SR is increased, the resultant change in reactance in windings 116, 117 of SR causes the voltage across T4P, T5P to become more in phase with the voltage of T2P. In consequence, the windings T4S, T5S fire the tubes 1, 2 earlier in their respective half cycles, increasing the motor speed.

The motor's separately excited field 102 is supplied in a suitable manner as, for example, through the more or less conventional rectifier arrangement shown, and which includes a pair of diodes 3, 4 which may be gaseous phanotron rectifiers. The anodes 119, 120 of the latter are connected to opposite end terminals of the supply transformer's secondary 104, while their cathodes 121, 122 are connected across the transformer secondary winding T2S. A center tap on the latter winding is connected to a supply conductor 123, the latter conductor being connected to one terminal of the motor field winding 102 through the delay relay contacts TDR1 heretofore noted. The other terminal of the field winding is connected to the supply line 115, the winding being shunted by the usual protective resistor 124.

To vary the saturation of the reactor SR, and thus adjust the speed of the drive motor 10 in the general manner described above, an electronic circuit is employed, the same being controlled by the potentiometer 26 heretofore noted as being included in the reversing control panel as a primary speed adjusting device. Current for this electronic circuit is supplied from the rectifier tubes 3, 4 heretofore noted. For that purpose the supply line 123 from these rectifiers is connected through a filter reactor 125 and a resistance R7 to one terminal of a voltage divider comprising series connected resistors R8, R9 and R10. The other terminal of this divider is connected to the supply line 115. A capacitor C5 coacts with the reactor 125 in filtering the potential applied to the voltage divider so that a smooth direct current voltage exists across the latter, the amount of this voltage being regulated by tubes C and D which operate on the constant arc-drop principle. Any excess or difference in voltage appears across the resistor R7 so that the drop across the divider remains constant.

In the electronic circuit for controlling the flow of direct current through the winding 118 of the saturable core reactor SR, a triode tube A1 is employed with the winding 118 connected in the output circuit of such tube by conductors 126, 127. The potential of the control grid 128 of the tube A1, and hence the amount of direct current passed through the winding 118, depends upon the voltage drop across the resistor R8 to which such grid is connected through resistors R18 and R9. The amount of the voltage drop across the resistor R8 depends, in turn, upon how much current is passing through triode tubes A2 and B1. In general, the tube A2 is employed for varying the drop across the resistor R8 in accordance with the setting of the speed control potentiometer 26, whereas the tube B1 is employed as part of an arrangement for safely limiting the current supplied to the motor armature.

Referring somewhat more in detail to the connections for the triode A2, which may, incidentally, be included in the same envelope as A1 if desired, it will be observed that its cathode 129 is connected to the slider 27 of the speed control potentiometer 26 in order to include this potentiometer in the input circuit for the tube A2. Thus the input circuit for this tube extends from its grid 130 through a resistor R16 and conductor 131 to the slider 132 of an armature-voltage control potentiometer R34, through a resistor R14 and slider 133 of a potentiometer R32, and thence through conductor 115 and through the speed control potentiometer 26 back to the cathode 129. Turning the slider 27 of the potentiometer 26 in the direction marked "fast" raises the potential of the cathode 129 for tube A2, while its grid 130 remains constant. There is therefore a decrease in current through the tube A2 so that the voltage drop across the resistor R8 is diminished. This results in a rise in potential applied to the grid 128 of the primary tube A1 so that the flow of current from this tube through the control winding 118 of the saturable core reactor SR is increased, thereby effecting an increase in motor speed in the manner heretofore described. Obviously a turning of the potentiometer slider 21 in the opposite or "slow" direction will result in an inverse action for diminishing the motor speed. The motor speed may thus be varied progressively to increase or decrease the same simply by adjusting the potentiometer 26.

As to the action of the potentiometer R34 in adjusting the armature voltage, it will be noted that this potentiometer together with resistors R14, R15 and the potentiometer R32 is connected across the motor armature through conductors 134, 135. As the voltage across the motor armature increases, the voltage across the portion of potentiometer R34 connected by its slider 132 to the grid of tube A2 through conductor 131 also increases. This results in an increase in current through the tube A2 and resistor R8 so that the current through the tube A1 is decreased and the voltage which the tubes 1 and 2 supply to the motor armature is diminished, thereby regulating the armature voltage back to normal.

It may also be noted in passing that the potentiometer R32 heretofore noted serves to compensate for the resistance drop through the armature while another potentiometer R33 coacts with the tube B1 in preventing the motor armature from receiving more than the selected amount of current at any time. To obtain an indication of the actual amount of current passing through the motor armature 100 for use in performing these control functions a pair of coupling transformers T3 are utilized, the same having primary windings T3P connected in the anode leads of respective ones of the tubes 1 and 2. The opposite end terminals of the secondary windings T3S of these transformers are connected to respective anodes of a rectifier tube B2 through conductors 136, 137, while a common lead 138 from the other end terminals of these secondaries is connected to the cathode of the tube B2 through the potentiometer R32 and R33. In this way a rectified potential is applied across these potentiometers which is directly proportional to the armature current. Capacitors 139 connected between the slider 133 of the potentiometer R32 and one of its end terminals smooth out the ripples from the potential applied by the intervening portion of this potentiometer to the electronic circuit.

Adjustment in the position of the slider 133 of the potentiometer R32 varies the grid potential of the tube A2. As the motor armature current increases, which would cause a corresponding small decrease in the speed of an ordinary direct current motor, the speed drop can be eliminated by turning the slider of potentiometer R32 to cause the grid potential of the tube A2 to decrease slightly, thereby causing an increase in the current flow through the tubes 1 and 2 and increase the voltage across the motor armature enough to maintain constant speed of the motor. The potentiometer R33, on the other hand, is adjusted to determine the maximum amount of current that will be permitted to pass through the motor armature irrespective of whether any tendency to further increase is caused by overload, starting or plugging. For example, if R33 is set to limit the motor current to 150%, then any increase in current above 150% will cause the voltage at the slider 140 to become slightly more positive than usual, thereby increasing the voltage on the grid 141 of the tube B1. This causes an increase in current through the tube B1, and as heretofore noted, the output current of this tube passes through the resistor R8 so that the potential on the grid of the tube A1 is lowered and the output of the latter tube decreased. Accordingly, there is a decrease in the amount of voltage which the tubes 1, 2 apply to the motor armature.

At the instant the reversing switch 28 closes its contacts for either forward or reverse motion, it is desirable to prevent a sudden surge of current through the motor during the first few cycles. It is to accomplish this that the normally closed auxiliary contacts F4 and R4 are connected in the electronic circuit as shown. When neither of the reversing contactors is energized these contacts connect the input terminal of resistor R7 to the grid 141 of the tube B1 through a resistor R35 so that the latter grid is at a higher potential than during normal operation and the tube B1 passes a high current, keeping the output of the tube A1 at a low value. In consequence, the tubes 1, 2 supply a very small amount of voltage for the motor armature. When either of the reversing contactors is energized, the grid voltage of the tube B1 is prevented from immediately decreasing to its normal value upon opening of F4 or R4 by the capacitor C6. The resistor R11 in series with the latter capacitor limits the rate at which the capacitor can charge up to the normal voltage between grid and anode for the tube B1 and thus provides a gradual turning off of the current for this tube and a corresponding gradual turning on of the current from tube A1. Five or six cycles are normally occupied in building up the output current of the tube A1 to its normal value. The input circuit of the tube B1 extends from the grid 141 through the resistors R35 and R12 to the slider 140 of the potentiometer R33, thence through the resistor R21 and conductor 115 across the speed control potentiometer 26 and back through conductor 142 to the cathode 143 of the tube B1. The latter tube does not pass current except in the event of excess armature current and during the first few cycles following closure of either of the reversing contactors.

In carrying out the present invention provision is made for utilizing the Microswitches 54, 55 to substitute a potentiometer 144, fixed at a low speed setting, in lieu of the speed control potentiometer 26 whenever one of the Microswitches is closed in the manner heretofore described preparatory to reversal. By substituting a fixed setting potentiometer such as 144 for the variable setting device 26 any necessity for disturbing the setting of the latter is obviated and in consequence the system is conditioned for resumption of operation at a previously chosen speed upon restoration of the potentiometer 26 to service. To effect the changeover of the potentiometers as noted, the Microswitches 54, 55 are connected in parallel with each other and both in series with the actuating winding CR2 of a control relay across the supply conductors 106, 107. Moreover, the auxiliary contacts 28a, 28b of the reversing switch 28 are connected in series with respective ones of the Microswitches. Normally closed contacts CR2—1 and CR2—2 of the relay CR2 are interposed on opposite sides of the potentiometer 26, while its normally open contacts CR2—3 and CR2—4 are interposed on opposite sides of the substitute potentiometer 144. It will thus be seen that when the reversing switch 28 is in its "forward" position (i. e., has its contacts 28a closed) closure of the companion Microswitch 54 at the end of the forward stroke of the carriage 11 will energize the relay CR2, thereby cutting the potentiometer 26 out of circuit and cutting the potentiometer 144 into circuit in place of it. Similarly, when the reversing switch is in its "reverse" position, closure of the companion Microswitch 55 effects the same substitution of the potentiometer 144 for the potentiometer 26.

The potentiometer 144 is permanently set at a predetermined fixed value, preferably equal to or slightly less than the lowest speed setting of the potentiometer 26. Substitution of the potentiometer 144 for the potentiometer 26 thus conditions the motor control circuit for operation at the low speed dictated by the preset value of 144.

To minimize the time which would otherwise be consumed in permitting the motor to coast to its newly established low speed, provision is made for automatically applying dynamic braking to decelerate the same whenever its actual speed is in excess of the setting of the potentiometer which is in control. For that purpose a dynamic braking resistance 145 is arranged to be connected across the motor armature 100 by the contacts CRB1 of a dynamic braking relay having an actuating winding CRB. The latter winding is connected across the supply lines 106, 107 through the normally closed contact CRA1 of a control relay having an actuating winding CRA. The latter winding is in the output circuit of a triode tube H, being connected to the latter's anode 146.

The tube H serves in effect as a part of a voltage responsive relay set-up for causing the dynamic braking resistor 145 to be cut into circuit whenever the actual armature current exceeds the value dictated by the setting of the speed control potentiometer which is in service (i. e., potentiometer 26 or 144). For that purpose the control grid 147 of the tube H is connected through a resistor RA with the slider 148 of a potentiometer 149 connected in series with a resistor RB across the voltage divider resistor R9. The potentiometer 149 is adjusted in setting up the system initially so that the tube H will normally pass current to retain the relay CRA energized, and thus keep the braking resistor 145 out of circuit, so long as the actual armature current of the motor does not exceed the setting of the control potentiometer. The one of the two available control potentiometers 26 and 144 which is in service is always connected in the input circuit of the tube H, the cathode 150 of the latter being connected to the line 142. On the other hand, the slider 140 of the potentiometer R33 is connected to one terminal of the resistor R9 and the potential of this slider is, as heretofore noted, directly proportional to the armature current. Consequently, if the armature current exceeds the setting of the speed control potentiometer, the potential on the grid 147 of the tube H will decrease, thereby deenergizing the relay CRA so that contacts CRB1 close to cut in the dynamic braking resistor 145. As soon as the resulting deceleration of the armature has reduced the armature current to a value commensurate with the setting of the speed control potentiometer, the relay CRA is reenergized and the braking resistor cut out again. It will be appreciated that upon substitution of the low speed setting potentiometer 144 for the potentiometer 26, in the manner heretofore described, preparatory to reversal, the prevailing armature current will substantially exceed the value dictated by the setting of the potentiometer 144. Accordingly, the tube H will cause the dynamic braking resistor 145 to be cut into service substantially immediately thereafter and the motor rotor will thus be dynamically braked quickly to the preset low speed desired as a preliminary to throwing of the reversing switch.

As soon as the reversing switch 28 is thrown from one of its "on" positions to the other, the potentiometer 26 is automatically restored to service and operation of the motor 10 is resumed in the new direction at the speed dictated by the setting of such potentiometer. Thus, if the motor has been operating with contacts 28a of the reversing switch closed, Microswitch 54 will be closed at the end of the carriage stroke to pick up the relay CR2 and institute the reversing cycle. As soon as the reversing switch contacts 28a thereafter open they cut the switch 54 out of service and contacts 28b close, putting switch 55 into service. The latter switch being open, the relay CR2 drops out and restores the potentiometer 26 to the circuit in place of potentiometer 144. Obviously the same type of action takes place upon throw of the reversing switch at the opposite end of the carriage travel. In either case, throwing the reversing switch results in an immediate resumption of traverse, in the new direction, at the previously prevailing high speed. It is particularly to be noted that the operating dog 45 or 46, as the case may be, does not have to be cleared from the depressed plunger 48 or 49 before such resumption of high speed can take place.

We claim as our invention:

1. The combination of a reciprocable dog presenting an inclined surface, a plunger slidably mounted for endwise motion adjacent the path of said dog and in position to be overridden thereby and progressively pushed endwise by said inclined surface, bias means yieldably urging the plunger toward the path of said dog, a two-position switch operator yieldably urged toward a first position therefor and located to intercept said plunger and limit the latter's movement under the influence of said bias means while leaving it free to be moved in the opposite direction by said dog, the pressure of said biased plunger against said operator serving to retain the latter in its second position and movement of said plunger by said dog freeing said operator for movement of the latter to said first position, and means for shifting said operator bodily while the biased plunger remains in contact therewith, to thereby alter the point on said inclined surface which first strikes said plunger as said dog overrides the latter.

2. The combination of a reciprocable dog presenting an inclined surface, a plunger slidably mounted for endwise motion adjacent the path of said dog and in position to be overridden thereby and progressively pushed endwise by said inclined surface, bias means yieldably urging the plunger toward the path of said dog, a two-position switch operator yieldably urged toward a first position therefor and located to intercept said plunger and limit the latter's movement under the influence of said bias means while leaving it free to be moved in the opposite direction by said dog, the pressure of said biased plunger against said operator serving to retain the latter in its second position and movement of said plunger by said dog freeing said operator for movement of the latter to said first position, a manually operable rotationally adjustable speed control device, and means operable in response to rotational adjustment of said device for shifting said operator bodily while the biased plunger remains in contact therewith, to thereby alter the point on said inclined surface which first strikes said plunger as said dog overrides the latter and by an amount proportional to the speed setting of said control device.

3. The combination of a reciprocable dog presenting an inclined surface, a plunger slidably mounted for endwise motion adjacent the path of said dog and in position to be overridden thereby and progressively pushed endwise by said inclined surface, bias means yieldably urging the plunger toward the path of said dog, a two-position switch operator yieldably urged toward a first position therefor and located to intercept said plunger and limit the latter's movement under the influence of said bias means while leaving it free to be moved in the opposite direction by said dog, the pressure of said biased plunger against said operator serving to retain the latter in its second position and movement of said plunger by said dog freeing said operator for movement of the latter to said first position, a manually operable rotationally adjustable speed control device, a rotary cam fixed to said device to turn therewith and having an eccentric recess defining an internal spiral cam face, and means including a cam follower projecting into said recess for engagement with said cam face for shifting said operator bodily while the biased plunger remains in contact therewith during adjustment of said speed control device, to thereby alter the point on said inclined surface which first strikes said plunger as said dog overrides the latter.

4. In a control for an electric drive motor having a movable member, the combination of a spring-biased plunger, a cam carried by the motor driven member and having a configurated cam face for imparting a positive and graduated movement to said plunger as it rides over the latter, a manually operable rotationally adjustable speed control device for the drive motor, means operable in response to depression of said plunger by said cam for disabling said device, and means for adjusting the position of said plunger transversely of the path of movement of said cam in accordance with changes in the speed setting of said device for correspondingly altering the point in the path of movement of the motor driven member at which said configurated cam face strikes said plunger to move the latter.

5. In a control apparatus for a reversible electric drive motor of a reciprocatory element, the combination of a reversing switch, a pair of spring biased plungers mounted for independent endwise movement and having lost motion connections to said switch for shifting the same to alternative positions therefor upon completion of the endwise shift of the respective ones of said plungers, cam means carried by the motor driven element presenting configurated cam surfaces engageable with respective ones of said plungers at opposite limits of the element's path of movement to progressively shift the engaged plunger endwise, and means operable in response to shift of either plunger by said cam means prior to its actuation of said switch for automatically altering the energization of the motor preparatory to reversal of the latter by said switch.

6. In a control unit for a reversible electric drive motor of a reciprocatory element, the combination of a housing adapted to be positioned adjacent the element and having a pair of parallel spaced plungers protruding therefrom, said plungers being slidable endwise and spring biased in the direction of their protrusion, a pair of cams adapted to be mounted in adjusted spaced relation on said element for engagement with the protruding ends of respective ones of said plungers in opposite limit positions of said element, said cams being configurated for positive and graduated depression of said plungers upon engagement therewith, a reversing switch carried by said housing and having lost motion connections with said plungers for actuation of the switch into alternative positions therefor in response to completion of the depression of respective ones of said plungers by said cams, a rotatively adjustable speed control device having a rotary manual operator on said housing, a rotatable cam fixed to said operator to turn therewith and having an eccentric recess therein presenting a spiral cam surface, a third plunger slidably mounted in said housing in parallelism with the first-mentioned pair and carrying a cam follower projecting into said recess, said third plunger being spring biased to retain said follower in engagement with said spiral cam surface, a pair of two-position auxiliary control switches carried by said third plunger for bodily movement therewith, said switches each being normally biased to one position therefor and having operating devices disposed for contact with projections on respective ones of said first-mentioned pair of plungers, the pressure of such plunger-borne projections on said switch operating devices serving to retain said switches in second positions therefor while in contact therewith and the raising and lowering of said third plunger incident to rotary adjustment of said speed control device serving to raise and lower simultaneously said first-mentioned pair of plungers and thus alter the points in the path of travel of said reciprocatory element at which they are depressed by their coacting cams to free them from said auxiliary switches and operate said reversing switch.

CHARLES Z. MONROE.
VICTOR G. SMITH.

REFERENCES CITED

The following references are of record in the file of this patent:

UNITED STATES PATENTS

| Number | Name | Date |
|---|---|---|
| 936,577 | Steckel | Oct. 12, 1909 |
| 1,936,572 | Carroll et al. | Nov. 28, 1933 |
| 2,020,961 | Quarles | Nov. 12, 1935 |
| 2,130,489 | Heart et al. | Sept. 20, 1938 |
| 2,164,958 | Stein | July 4, 1939 |
| 2,193,642 | Parvin | Mar. 12, 1940 |
| 2,205,566 | Kollner | June 25, 1940 |
| 2,221,324 | Goff | Nov. 12, 1940 |
| 2,235,558 | Mathewson et al. | Mar. 18, 1941 |
| 2,238,614 | Williams et al. | Apr. 15, 1941 |
| 2,312,117 | Moyer | Feb. 23, 1943 |
| 2,349,882 | Reichelt | May 30, 1944 |
| 2,361,212 | King | Oct. 25, 1944 |